(12) United States Patent
Kitamura

(10) Patent No.: US 7,512,045 B2
(45) Date of Patent: Mar. 31, 2009

(54) MEDIUM JUDGMENT METHOD, STORAGE MEDIUM, MEDIUM JUDGMENT PROGRAM, AND OPTICAL DISK DRIVE USING THE MEDIUM JUDGMENT METHOD

(75) Inventor: Yuuji Kitamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 494 days.

(21) Appl. No.: 10/706,114

(22) Filed: Nov. 13, 2003

(65) Prior Publication Data

US 2004/0130990 A1    Jul. 8, 2004

(30) Foreign Application Priority Data

Nov. 15, 2002  (JP)  ............................ 2002-332526
May 16, 2003   (JP)  ............................ 2003-139492

(51) Int. Cl.
      *G11B 27/36*    (2006.01)
(52) U.S. Cl. ................................. 369/53.21; 369/53.22
(58) Field of Classification Search ............. 369/53.21, 369/53.37, 53.11, 53.12, 53.22
      See application file for complete search history.

(56) References Cited

U.S. PATENT DOCUMENTS

| 5,237,551 | A  |   | 8/1993  | Ogawa et al. |          |
|-----------|----|---|---------|--------------|----------|
| 5,699,331 | A  | * | 12/1997 | Oshima       | 369/47.11 |
| 5,926,453 | A  | * | 7/1999  | Muramatsu et al. | 369/275.4 |
| 5,963,536 | A  | * | 10/1999 | Vasic et al. | 369/275.3 |
| 6,285,638 | B1 | * | 9/2001  | Konishi et al. | 369/47.19 |
| 6,414,922 | B1 | * | 7/2002  | Akiyama et al. | 369/47.52 |
| 2002/0006094 | A1 | * | 1/2002 | Teramoto | 369/53.21 |
| 2002/0041554 | A1 |   | 4/2002 | Kitamura |          |
| 2002/0159360 | A1 | * | 10/2002 | Tosaki et al. | 369/53.21 |
| 2003/0002671 | A1 | * | 1/2003 | Inchalik et al. | 380/202 |
| 2003/0145181 | A1 | * | 7/2003 | Bae | 711/163 |
| 2003/0174605 | A1 | * | 9/2003 | Sako et al. | 369/47.24 |

FOREIGN PATENT DOCUMENTS

| JP | 11-167769   | 6/1999 |
| JP | 2000-100068 | 4/2000 |
| JP | 2000-123479 | 4/2000 |
| JP | 2002-182770 | 6/2002 |

* cited by examiner

*Primary Examiner*—Thang V Tran
*Assistant Examiner*—Thomas D Alunkal
(74) *Attorney, Agent, or Firm*—Dickstein Shapiro LLP

(57) ABSTRACT

A medium judgment method determines authorization of a rewritable storage medium of interest having a read-only area and a rewritable area for use in an optical disk drive. In the medium judgment method, a specific information of the medium is acquired from an information reproduction area of the read-only area of the medium. It is determined whether contents of the medium are authorized based on the acquired specific information. Running of a starting process of the optical disk drive with the medium is permitted when the authorization of the medium is determined as being correct. Running of the starting process of the optical disk drive with the medium is inhibited when the authorization of the medium is determined as being incorrect.

16 Claims, 5 Drawing Sheets

MEDIUM JUDGMENT METHOD, STORAGE MEDIUM, MEDIUM JUDGMENT PROGRAM, AND OPTICAL DISK DRIVE USING THE MEDIUM JUDGMENT METHOD

BACKGROUND OF THE INVENTION

1. Field of the Invention

The present invention relates to a medium judgment method, a computer-readable storage medium and a medium judgment program which determine whether it is a storage medium with which unauthorized duplication of original storage medium is performed, in order to prevent the unauthorized duplication, and also relates to an optical disk drive which uses the medium judgment method.

2. Description of the Related Art

Conventionally, the contents of software, such as application programs, still pictures, and moving pictures, in many cases are distributed in the form of CD-ROM or in compliance with the same. Moreover, various rewritable CDs (CD-R, CD-RW, etc.) are used for the distribution media carrying the contents of software. Furthermore, recently, a hybrid CD having the read-only area and the rewritable area has been developed as a new distribution medium. It is proposed to distribute a hybrid CD which substitutes for CD-ROM, and in the hybrid CD the contents of software are beforehand written in the read-only area of the hybrid CD.

A description will be given of the data structure of CD-R or CD-RW. In the following, CD-R or CD-RW will be called the disk. The information area is provided to hold information on the disk, and it is composed of a lead-in area, a data area, and a lead-out area.

The starting-position information indicating the starting position of two or more subsequent tracks on the disk is written in the lead-in area. This information is also called TOC (table of contents) information. The data (the contents of software) is written in the data area. The lead-out area is provided to indicate a position of the end of the data area on the disk.

The R-information area is disposed inside the information area. This R-information area is provided for the PCA or RMA, and it is the area that is specific to CD-R and CD-RW. The PCA is the area for calibrating the recording laser power, and the RMA is the area for recording management information.

On the substrate of the disk, the wobbling groove and the land prepit are formed. The wobbling groove is the data-carrying groove which is waved with a certain amplitude and spatial frequency, and it is provided to generate a gate signal for detecting the land prepit etc. The wobble signal, which is described in the optical disk by the wobbling of the track, is indicative of the absolute-time information called ATIP (absolute time in pre-groove).

The land prepit is an isolated pit which is disposed in accordance with a certain rule on the area called the land between adjacent grooves, and it is used for high precision positioning at the time of data recording, etc.

Several medium judgment methods have been proposed in order to take advantage of the above-described characteristics of the disk, and prevent that the contents of software recorded in the original medium are not illegally copied to other media.

As the conventional method for prevention of illegal copying, there is a method in which the contents of software are encrypted using the specific information that is specific to each disk and recorded on the disk, and the encrypted data is recorded on the disk. When reproducing the data from the disk, the encrypted contents are decrypted using the specific information. Refer to Japanese Laid-Open Patent Application No. 2000-100068.

Japanese Laid-Open Patent Application No. 2002-182770 discloses a method in which, using the information which is given to the authorized disk and which is not rewritable, it is determined whether the information on a disk of interest for medium judgment is in agreement with the information on the authorized disk. In the disclosure of Japanese Laid-Open Patent Application No. 2002-182770, the example of DVD-ROM is taught.

There is another method in which the ID of an optical disk drive of an authorized user is recorded on an optical disk, and the ID read from the optical disk is compared with the ID of a currently used optical disk drive. If the agreement occurs, the starting of the program recorded on the optical disk is allowed for the currently used optical disk drive. Refer to Japanese Laid-Open Patent Application No. 2000-123479.

There is still another method in which the disk and the reproduction permission medium (for example, an IC card) are set in the reproducing apparatus, and the reproduction management information of the disk and the reproduction permission information of the IC card are read out, and the checking of these data is performed. If the match occurs, the reproduction of the contents of software is allowed. Refer to Japanese Laid-Open Patent Application No. 11-167769.

However, according to the conventional illegal copy prevention methods, it is necessary to use a special optical disk drive that is in compliance with a corresponding one of the illegal copy prevention methods when reproducing the contents of software from the disk. Furthermore, the ATIP (absolute time in pre-groove) is specific to the rewritable optical disks, such as CD-R and CD-RW, and the ATIP does not exist on the read-only optical disks, such as CD-ROM. Therefore, the read-only disk drive, such as a CD-ROM drive, is not capable of reading out the ATIP from the disk when a rewritable optical disk with the ATIP recorded is inserted into the read-only disk drive.

SUMMARY OF THE INVENTION

An object of the present invention is to provide an improved medium judgment method in which the above-described problems are eliminated.

Another object of the present invention is to provide a medium judgment method which determines the authorization of a rewritable optical disk with the same reliability as in a rewritable optical disk drive when the rewritable optical disk is inserted in the read-only optical disk drive.

Another object of the present invention is to provide a computer-readable storage medium storing a program causing a computer to execute a medium judgment method which determines the authorization of a rewritable optical disk with the same reliability as in a rewritable optical disk drive when the rewritable optical disk is inserted in the read-only optical disk drive.

Another object of the present invention is to provide a program causing a computer to execute a medium judgment method which determines the authorization of a rewritable optical disk with the same reliability as in a rewritable optical disk drive when the rewritable optical disk is inserted in the read-only optical disk drive.

Another object of the present invention is to provide an optical disk drive which uses a medium judgment method which determines the authorization of a rewritable optical disk with the same reliability as in a rewritable optical disk drive when the rewritable optical disk is inserted in the read-only optical disk drive.

The above-mentioned objects of the present invention are achieved by a medium judgment method which determines authorization of a rewritable storage medium having a read-only area and a rewritable area for use in an optical disk drive, the method comprising steps of: acquiring a specific information of the medium from an information reproduction area of the read-only area of the medium; determining whether contents of the medium are authorized based on the acquired specific information; permitting running of a starting process of the optical disk drive with the medium when the authorization of the medium is determined as being correct; and inhibiting running of the starting process of the optical disk drive with the medium when the authorization of the medium is determined as being incorrect.

The above-mentioned objects of the present invention are achieved by a medium judgment method which determines authorization of a rewritable storage medium having a read-only area and a rewritable area for use in an optical disk drive, the method comprising steps of: acquiring a first specific information of the medium from a wobbling groove of the medium; acquiring a second specific information of the medium from an information reproduction area of the read-only area of the medium, the second specific information being pre-recorded in the information reproduction area when the first specific information is copied; determining whether contents of the medium are authorized based on both the acquired first specific information and the acquired second specific information; permitting running of a starting process of the optical disk drive with the medium when the authorization of the medium is determined as being correct; and inhibiting running of the starting process of the optical disk drive with the medium when the authorization of the medium is determined as being incorrect.

The above-mentioned objects of the present invention are achieved by an optical disk drive which determines authorization of a rewritable optical disk having a read-only area and a rewritable area, the optical disk drive comprising: a system control unit controlling the entire optical disk drive; an optical head irradiating a light beam to the disk and performing reading/writing of information with the disk by the control of the system control unit; a motor rotating the disk; a position control unit performing a position control of the optical head and a rotation control of the motor by the control of the system control unit; and a signal processing unit performing signal processing of data read from the disk by the control of the system control unit, the system control unit comprising: an acquiring unit acquiring a specific information of the disk from an information reproduction area of the read-only area of the disk; a determining unit determining whether contents of the disk are authorized based on the acquired specific information; a permitting unit permitting running of a starting process of the optical disk drive with the disk when the authorization of the disk is determined as being correct; and an inhibiting unit inhibiting running of the starting process of the optical disk drive with the disk when the authorization of the disk is determined as being incorrect.

The above-mentioned objects of the present invention are achieved by an optical disk drive which determines authorization of a rewritable optical disk having a read-only area and a rewritable area, the optical disk drive comprising: a system control unit controlling the entire optical disk drive; an optical head irradiating a light beam to the disk and performing reading/writing of information with the disk by the control of the system control unit; a motor rotating the disk; a position control unit performing a position control of the optical head and a rotation control of the motor by the control of the system control unit; and a signal processing unit performing signal processing of data read from the disk by the control of the system control unit, the system control unit comprising: a first acquiring unit acquiring a first specific information of the disk from a wobbling groove of the disk; a second acquiring unit acquiring a second specific information of the disk from an information reproduction area of the read-only area of the disk, the second specific information being pre-recorded in the information reproduction area when the first specific information is copied; a determining unit determining whether contents of the disk are authorized based on both the acquired first specific information and the acquired second specific information; a permitting unit permitting running of a starting process of the optical disk drive with the disk when the authorization of the disk is determined as being correct; and an inhibiting unit inhibiting running of the starting process of the optical disk drive with the disk when the authorization of the disk is determined as being incorrect.

According to one aspect of the present invention, the authorization of a storage medium of interest is determined based on the second specific information which is pre-recorded in the information reproduction area of the medium when the first specific information from the wobbling groove of the medium is reproduced or copied. Even when the storage medium concerned is inserted in an optical disk drive which cannot read the first specific information of the medium, such as the CD-ROM drive, the judgment as to whether the storage medium concerned is an illegally copied medium or not can be performed with the same reliability as in the rewritable optical disk drive.

According to another aspect of the present invention, the first specific information which is pre-recorded in the pre-groove of the storage medium is acquired from the storage medium. The second specific information which is pre-recorded in the information reproduction area of the storage medium when the first specific information is reproduced or copied is acquired from the storage medium. The authorization of the storage medium of interest is determined based on the acquired first and second specific information. When the storage medium concerned is inserted in an optical disk drive which is capable of acquiring both the first specific information and the second specific information of the medium, the judgment as to whether the storage medium concerned is an illegally copied medium or not can be performed with a higher level of reliability.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

Figure 1:
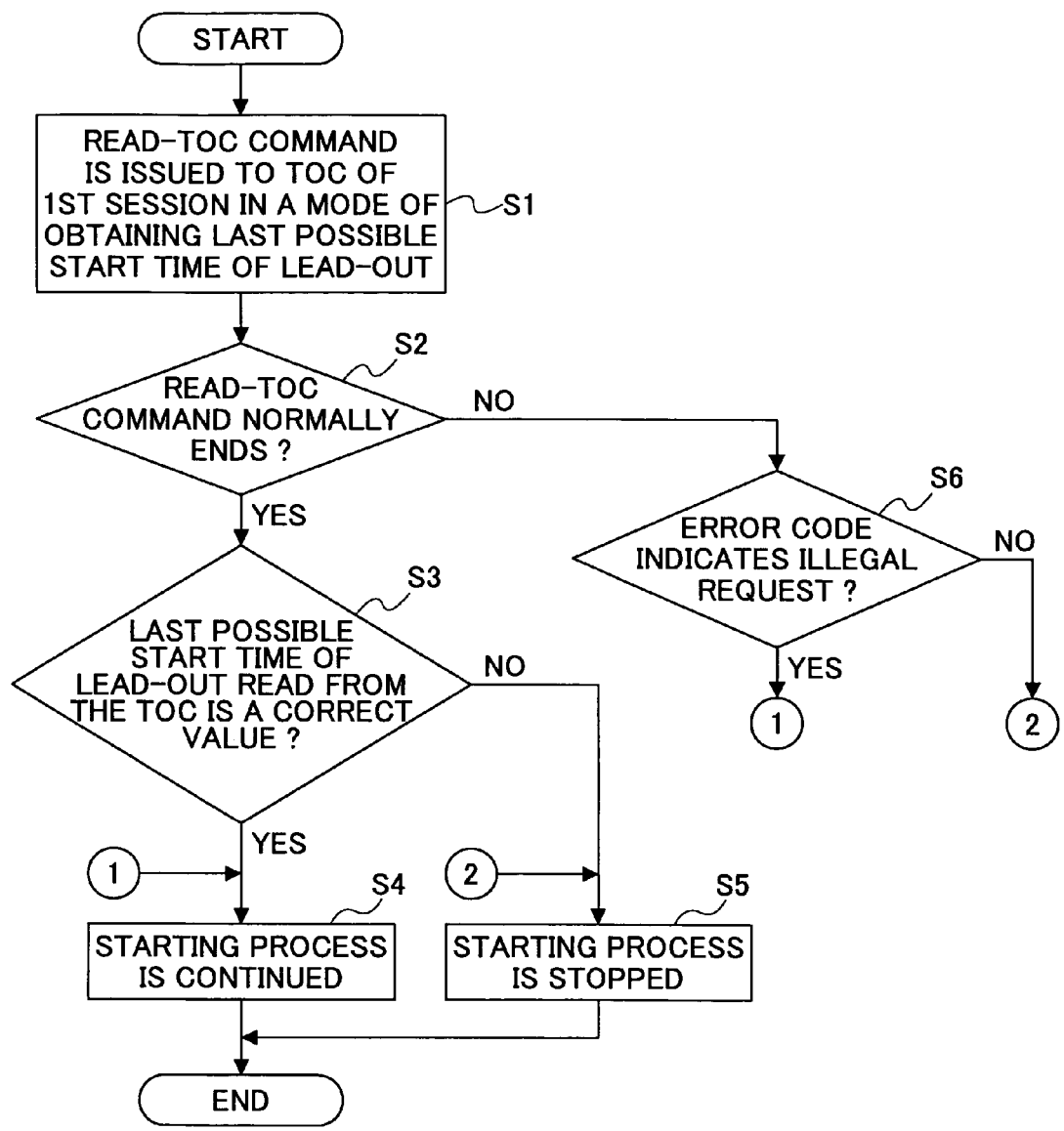
FIG. 1 is a flowchart for explaining a medium judgment method of one preferred embodiment of the invention, which is executed by a control unit of an optical disk drive.

A description will now be provided of the preferred embodiments of the present invention with reference to the accompanying drawings.

In the preferred embodiments of the invention, a hybrid CD-R disk is given as a typical example of storage medium having the read-only area and the rewritable area, a value of Last Possible Start Time of Lead-out in an ATIP of the medium is considered first specific information of the storage medium read from the pregroove of the medium, and a value of Last Possible Start Time of Lead-out in a TOC of the medium is considered second specific information of the-storage medium which is pre-recorded in an information reproduction area of the read-only area of the medium by reproducing the first specific information from the medium.

The Last Possible Start Time of Lead-out means the largest value that can be taken as a starting address by the Lead-out of the medium located at the end of the data session under the restrictions of storage capacity.

The value of Last Possible Start Time of Lead-out in the ATIP corresponds to the physical form of the wobbling groove of the medium and cannot be copied. Moreover, the value of Last Possible Start Time of Lead-out in the ATIP cannot be read by a read-only optical disk drive. The detailed descriptions of Last Possible Start Time of Lead-out are given in the orange book which is the standard specifications of CD-R.

In order to acquire the value of Last Possible Start Time of Lead-out in the ATIP, the READ-ATIP command is used as a command which is issued to the CD-R drive by the software (program). In order to acquire the value of Last Possible Start Time of Lead-out in the TOC, the READ TOC command is used as a command which is issued to the CD-R drive by the software (program). The READ TOC command and the READ ATIP command are specified in the Multi-Media Commands of the SCSI standard specifications.

The optical disk drives, such as CD-R drive, CD-RW drive or CD-ROM drive, which are currently available in the market are classified into Drive Classification #1, Drive Classification #2 and Drive Classification #3 as in the following, depending on the capability of acquiring the value of Last Possible Start Time of Lead-out from the optical disk with the READ ATIP command, and the capability of acquiring the value of Last Possible Start Time of Lead-out from the optical disk with the READ TOC command.

A description will be given of the optical disk drives of Drive Classification #1. The optical disk drives of this category are capable of acquiring the value of Last Possible Start Time of Lead-out by issuing the READ TOC command, and capable of acquiring the value of Last Possible Start Time of Lead-out by issuing the READ ATIP command. For example, the CD-R drives and the CD-RW drives belong to this category.

A description will be given of the optical disk drives of Drive Classification #2. The optical disk drives of this category are capable of acquiring the value of Last Possible Start Time of Lead-out by issuing the READ TOC command, but cannot acquire the value of Last Possible Start Time of Lead-out by issuing the READ ATIP command. The CD-ROM drives developed in recent years belong to this category.

A description will be given of the optical disk drives of Drive Classification #3. The optical disk drives of this category cannot acquire the value of Last Possible Start Time of Lead-out by issuing the READ TOC command, and cannot acquire the value of Last Possible Start Time of Lead-out by issuing the READ ATIP command. The CD-ROM drives developed earlier than Drive Classification #2 belong to this category.

Next, a description will be given of a medium judgment method of the first preferred embodiment of the invention with reference to FIG. 1.

As previously described, in the present embodiment, a hybrid CD-R disk is given as an example of storage medium having the read-only area and the rewritable area, a value of Last Possible Start Time of Lead-out in the ATIP of the medium is considered first specific information of the storage medium read from the pregroove of the medium, and a value of Last Possible Start Time of Lead-out in the TOC of the medium is considered second specific information of the storage medium which is pre-recorded in an information reproduction area of the read-only area of the medium by reproducing the first specific information from the medium.

It is supposed that the software (which is called the program) of the invention which is composed of a set of program code instructions and beforehand written in a computer-readable storage medium is read by a control unit (which is called the CPU) of the optical disk drive and stored, in advance, into a storage device of the optical disk drive. When the optical disk drive is powered up and a hybrid CD disk of interest for medium judgment is inserted into the drive, the CPU of the drive starts execution of the medium judgment method of the present embodiment by reading out the software of the invention from the storage device of the drive.

As shown in FIG. 1, the program causes the CPU to issue a READ TOC command to TOC of a first session of the disk of interest in a mode of obtaining Last Possible Start Time of Lead-out in the disk of interest which has been inserted in the optical disk drive (step S1). There are some modes in the READ TOC command, and the command is issued at step S1 in the mode that can acquire the value of Last Possible Start Time of Lead-out from the disk of interest.

The program causes the CPU to determine whether the READ TOC command ends normally (step S2). When the result of the determination at step S2 is affirmative, the control of the CPU is shifted to step S3. When the result of the determination at step S2 is negative, the control of the CPU is shifted to step S6.

If the control of the CPU is shifted to step S3, it is determined that the optical disk drive in which the disk of interest has been inserted belongs to Drive Classification #1 or #2.

The program causes the CPU to determine whether the acquired value of Last Possible Start Time of Lead-out is a correct value that is the second specific information of the disk of interest (step S3). When the result of the determination at step S3 is affirmative (the correct value), the program causes the CPU to continue the starting process (step S4). When the result of the determination at step S3 is negative (not the correct value), the program causes the CPU to stop the starting process (step S5).

When either the step S4 or the step S5 is performed, the medium judgment method of FIG. 1 is completed.

On the other hand, when the result of the determination at step S2 is negative (the READ TOC command does not normally end), the program causes the CPU to determine whether the error code of the READ TOC command is "illegal request."

When the result of the determination at step S6 is affirmative ("illegal request"), it is determined that the optical disk drive in which the disk of interest has been inserted belongs to Drive Classification #3. In this case, the control of the CPU is shifted to the above step S4 so that the starting process is continued.

When the result of the determination at step S6 is negative (not "illegal request"), it is determined that a certain abnormality occurs in the disk of interest or the optical disk drive. In this case, the control of the CPU is shifted to the above step S5 so that the starting process is stopped.

In the former case, the starting process is continued although the READ TOC command does not normally end. This is because there is the possibility that the disk of interest may be determined as being the right disk. At another step of the starting process, the medium judgment to determine whether it is the right disk will be performed again.

Next, a description will be given of a medium judgment method of the second preferred embodiment of the invention with reference to FIG. 2 and FIG. 3.

As previously described, in the present embodiment, a hybrid CD-R disk is given as an example of storage medium having the read-only area and the rewritable area, a value of Last Possible Start Time of Lead-out in the ATIP of the medium is considered first specific information of the storage medium read from the pregroove of the medium, and a value of Last Possible Start Time of Lead-out in the TOC of the medium is considered second specific information of the storage medium which is pre-recorded in an information reproduction area of the read-only area of the medium by reproducing the first specific information from the medium.

It is supposed that the software (the program) of the invention which is composed of a set of program code instructions and beforehand written in a computer-readable storage medium is read by the CPU of the drive and stored, in advance, into a storage device of the drive. When the optical disk drive is powered up and a hybrid CD disk of interest for medium judgment is inserted into the drive, the CPU of the drive starts execution of the medium judgment method of the present embodiment by reading out the software of the invention from the storage device of the drive.

Figure 2:
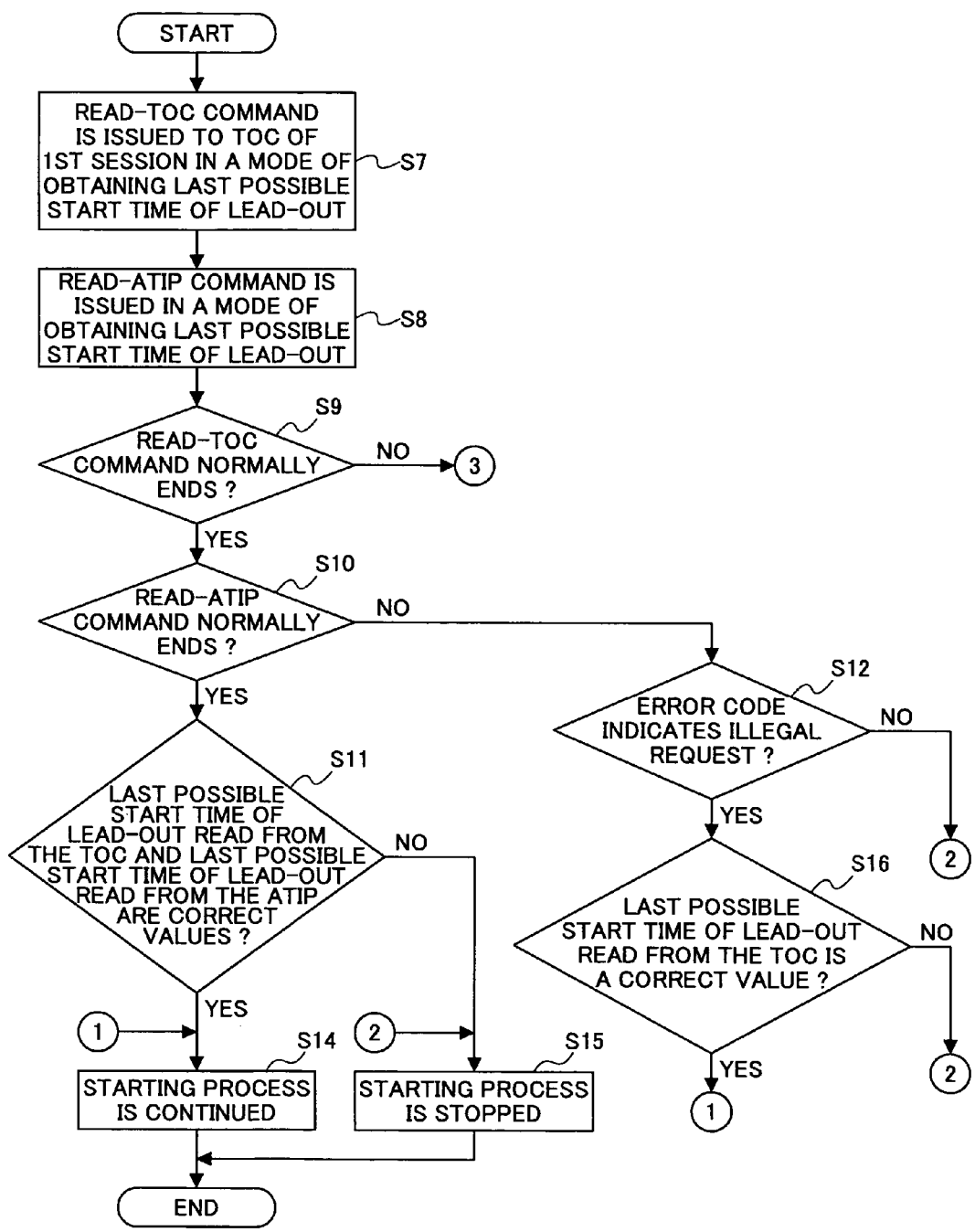
FIG. 2. is a flowchart for explaining a medium judgment method of another preferred embodiment of the invention, which is executed by a control unit of an optical disk drive.

As shown in FIG. 2, the program causes the CPU to issue a READ TOC command to TOC of a first session of the disk of interest in a mode of obtaining Last Possible Start Time of Lead-out in the disk of interest which has been inserted in the optical disk drive (step S7). There are some modes in the READ TOC command, and the command is issued at step S7 in the mode which can acquire the value of Last Possible Start Time of Lead-out from the disk of interest.

Next, the program causes the CPU to issue a READ ATIP command to the optical disk drive in a mode of obtaining Last Possible Start Time of Lead-out in the disk of interest which has been inserted in the optical disk drive (step S8).

After the step S8 is performed, the program causes the CPU to determine whether the READ TOC command ends normally (step S9). When the result of the determination at step S9 is affirmative, the control of the CPU is shifted to step S10. When the result of the determination at step S9 is negative, the control of the CPU is shifted to step S13 shown in FIG. 13.

At step S10, the program causes the CPU to determine whether the READ ATIP command ends normally. When the result of the determination at step S10 is affirmative, the control of the CPU is shifted to step S11. When the result of the determination at step S10 is negative, the control of the CPU is shifted to step S12.

If the control of the CPU is shifted to step S11, both the commands normally end and it is determined that the optical disk drive in which the disk of interest has been inserted belongs to Drive Classification #1.

At step S11, the program causes the CPU to determine whether the value of Last Possible Start Time of Lead-out, acquired from the TOC of the disk of interest, is a correct value that is the second specific information of the disk of interest and the value of Last Possible Start Time of Lead-out, acquired from the ATIP of the disk of interest, is a correct value that is the first specific information of the disk of interest.

When the result of the determination at step S11 is affirmative (both are the correct values), the program causes the CPU to continue the starting process (S14). When the result of the determination at step S11 is negative (at least one of the acquired values is not correct), the program causes the CPU to stop the starting process (S15). When either the step S14 or the step S15 is performed, the medium judgment method of FIG. 2 is completed.

On the other hand, when the result of the determination at step S10 is negative (the READ ATIP command does not normally end), the program causes the CPU to determine whether the error code of the READ ATIP command is "illegal request" (step S12).

When the result of the determination at the step S12 is affirmative ("illegal request"), it is determined that the optical disk drive in which the disk of interest has been inserted belongs to Drive Classification #2, and the control of the CPU is shifted to step S16. When the result of the determination at the step S12 is negative (not "illegal request"), the control of the CPU is shifted to the above step S15, so that the starting process is stopped.

At step S16, the program causes the CPU to determine whether the value of Last Possible Start Time of Lead-out, acquired from the TOC of the disk of interest, is a correct value that is the second specific information of the disk of interest. When the result of the determination at the step S16 is affirmative (the correct value), the control of the CPU is shifted to the above step S14, so that the starting process is continued. When the result of the determination at the step S16 is negative (not the correct value), the control of the CPU is shifted to the above step S15, so that the starting process is stopped.

In the present embodiment, the starting process is continued although the READ ATIP command does not normally end. This is because there is the possibility that the disk of interest may be determined as being the right disk. At another step of the starting process, the medium judgment to determine whether it is the right disk will be performed again.

If it is determined at the step S12 that the error code of the READ ATIP command is not "illegal request", then it is determined that a certain abnormality occurs in the disk of interest or the optical disk drive, and the control of the CPU is shifted to the above step 15.

Figure 3:
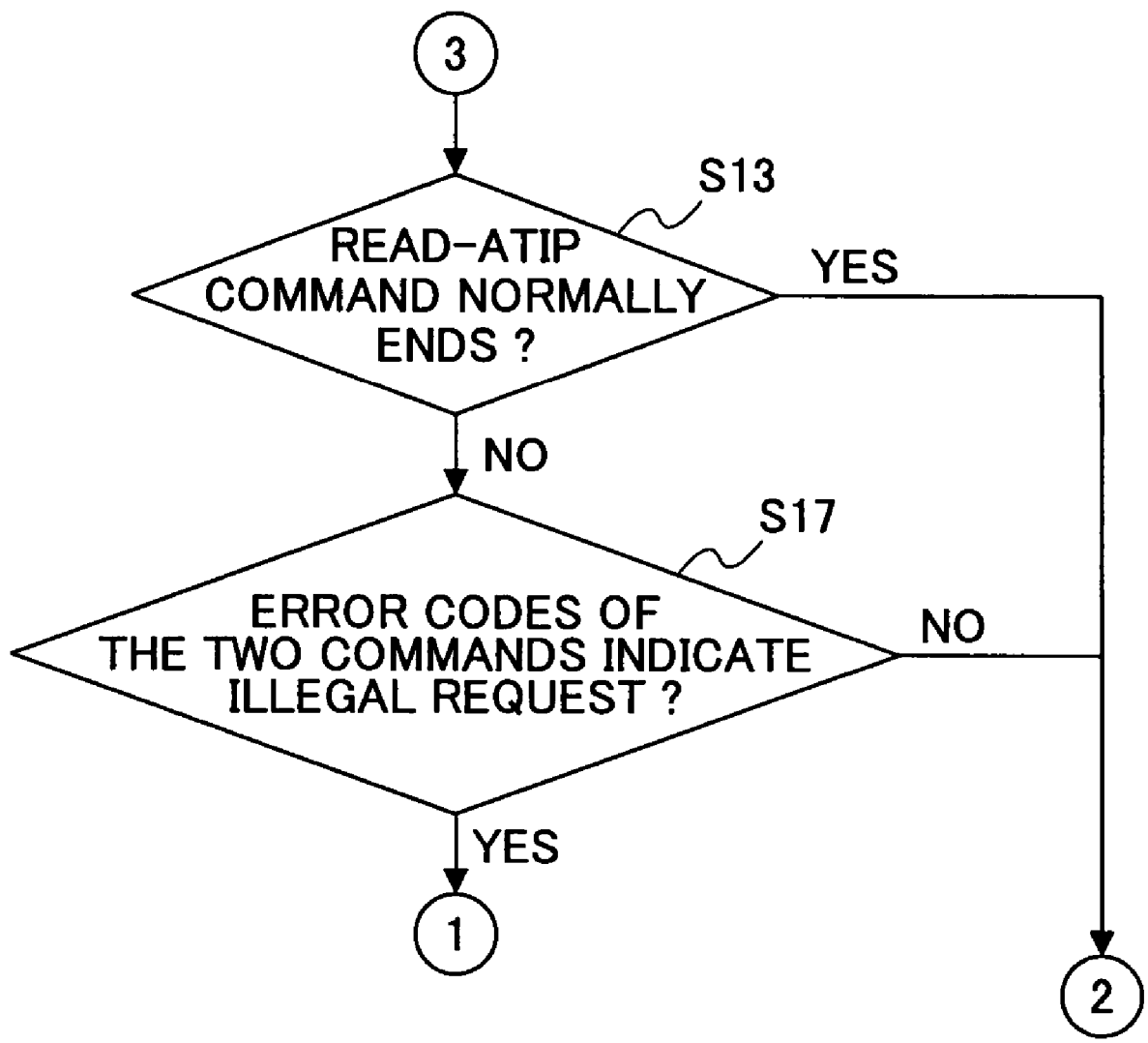
FIG. 3 is a flowchart for explaining the medium judgment method of the present embodiment when the READ TOC command does not normally end in the flowchart of FIG. 2.

FIG. 3 shows the medium judgment method of the present embodiment when the READ TOC command does not normally end in the flowchart of FIG. 2.

As shown in FIG. 3, when it is determined at the step S9 that the READ TOC command does not normally end, the program causes the CPU to determine whether the READ ATIP command normally ends (step S13). When the result of the determination at the step S13 is negative (both the commands do not end normally), the control of the CUP is shifted to step S17.

When the result of the determination at the step S13 is affirmative (only the READ ATIP command normally ends), it is determined that a certain abnormality occurs in the disk of interest or the optical disk drive, the control of the CPU is shifted to the above step 15, so that the starting process is stopped.

At step S17, the program causes the CPU to determine whether both the error code of the READ TOC command and the error code of the READ ATIP command are "illegal request". When the result of the determination at the step S17 is affirmative, both the error codes of the two commands are "illegal request" and it is determined that the optical disk drive in which the disk of interest has been inserted belongs to Drive Classification #3. In this case, the control of the CPU is shifted to the above step 14, so that the starting process is continued.

In the above-mentioned case, the starting process is continued although the READ TOC command does not normally end. This is because there is the possibility that the disk of interest may be determined as being the right disk. At another step of the starting process, the medium judgment to determine whether it is the right disk will be performed again.

When the result of the determination at the step S17 is negative (at least one of the error codes is not "illegal request"), it is determined that a certain abnormality occurs in the disk of interest or the optical disk drive, and the control of the CPU is shifted to the above step 15, so that the starting process is stopped.

Next, a description will be given of an optical disk drive of one preferred embodiment of the invention with reference to FIG. 4.

Figure 4:
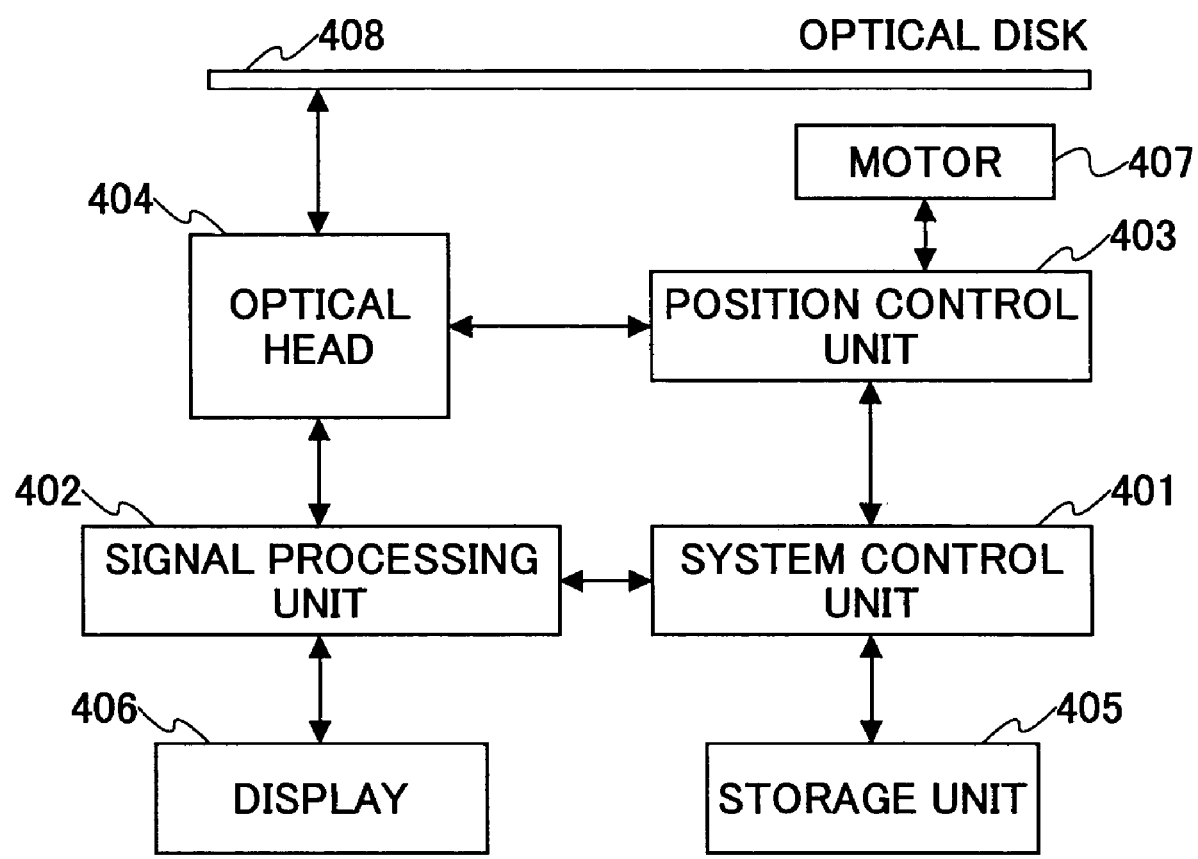
FIG. 4 is a block diagram of an optical disk drive of one preferred embodiment of the invention.

FIG. 4 shows the optical disk drive of the present embodiment. In the optical disk drive of the present embodiment, the medium judgment program of the invention to execute one of the medium judgment methods of the previously described embodiments is stored, in advance, into a storage device of the drive.

As shown in FIG. 4, the optical disk drive of the present embodiment comprises a system control unit 401, a signal processing unit 402, a position control unit 403, an optical head 404, a storage unit 405, a display 406, and a motor 407. An optical disk 408 is a storage medium of interest for medium judgment, and this optical disk 408 is inserted into the optical disk drive.

In the present embodiment, the optical disk 408 is a hybrid CD-R disk having the read-only area and the rewritable area, which has been described above. A value of Last Possible Start Time of Lead-out in an ATIP of the-optical disk 408 is considered first specific information of the optical disk 408 read from the pregroove of the optical disk 408, and a value of Last Possible Start Time of Lead-out in a TOC of the optical disk 408 is considered second specific information of the optical disk 408 which is pre-recorded in an information reproduction area of the read-only area of the optical disk 408 by reproducing the first specific information from the optical disk 408.

The system control unit 401 includes a CPU of the optical disk drive and controls the entire system of the optical disk drive. As described previously, the medium judgment program of the invention to determine the authorization of the optical disk 408 is performed by the system control unit 401.

The signal processing unit 402 performs signal processing of the information read from the optical disk 408, and sends the writing information to be written in the optical disk 408, to the optical head 404.

The position control unit 403 performs the position control of the optical head 404 with respect to the optical disk 408, the rotation control of the motor 407, and the position control of a light beam emitted from the optical head 404 to form a spot on the recording surface of-the optical disk 408. The motor 407 is provided to rotate the optical disk 408.

The optical head 404 includes a semiconductor laser as the light source to emit a laser light beam, a beam splitter, various lenses, an optical detector, etc. The optical head 404 irradiates the laser light beam to the optical disk 408, and carries out the reading and writing of information with the optical disk 408.

The storage unit 405 is a storage device which stores the medium judgment program of the invention and the information of the optical disk.

The display 406 is provided to display the information concerning the optical disk 408 which is obtained during the execution of the medium judgment method of the invention.

When the optical disk drive is powered up and the optical disk 408 is inserted, the system control unit 401 starts the execution of the medium judgment method of the invention (as described above with reference to FIG. 1 to FIG. 3) by reading out the program of the invention from the storage unit 405.

The first specific information and the second specific information of the optical disk 408 are read by the optical head 404, and the read information is supplied from the optical head 404 to the system control unit 401 through the signal processing unit 402.

Through the execution of the medium judgment method of the invention, the system control unit 401 determines the authorization of the optical disk 408 by using the specific information or the error information of the optical disk 408. Under the circumstances, the classification of the optical disk 408 stored in the storage unit 405 is referred to by the system control unit 401. When the optical disk 408 is determined as being an unauthorized disk as a result of the medium judgment, such information will be displayed on the display 406.

Next, a description will be given of an optical disk drive of another preferred embodiment of the invention with reference to FIG. 5.

Figure 5:
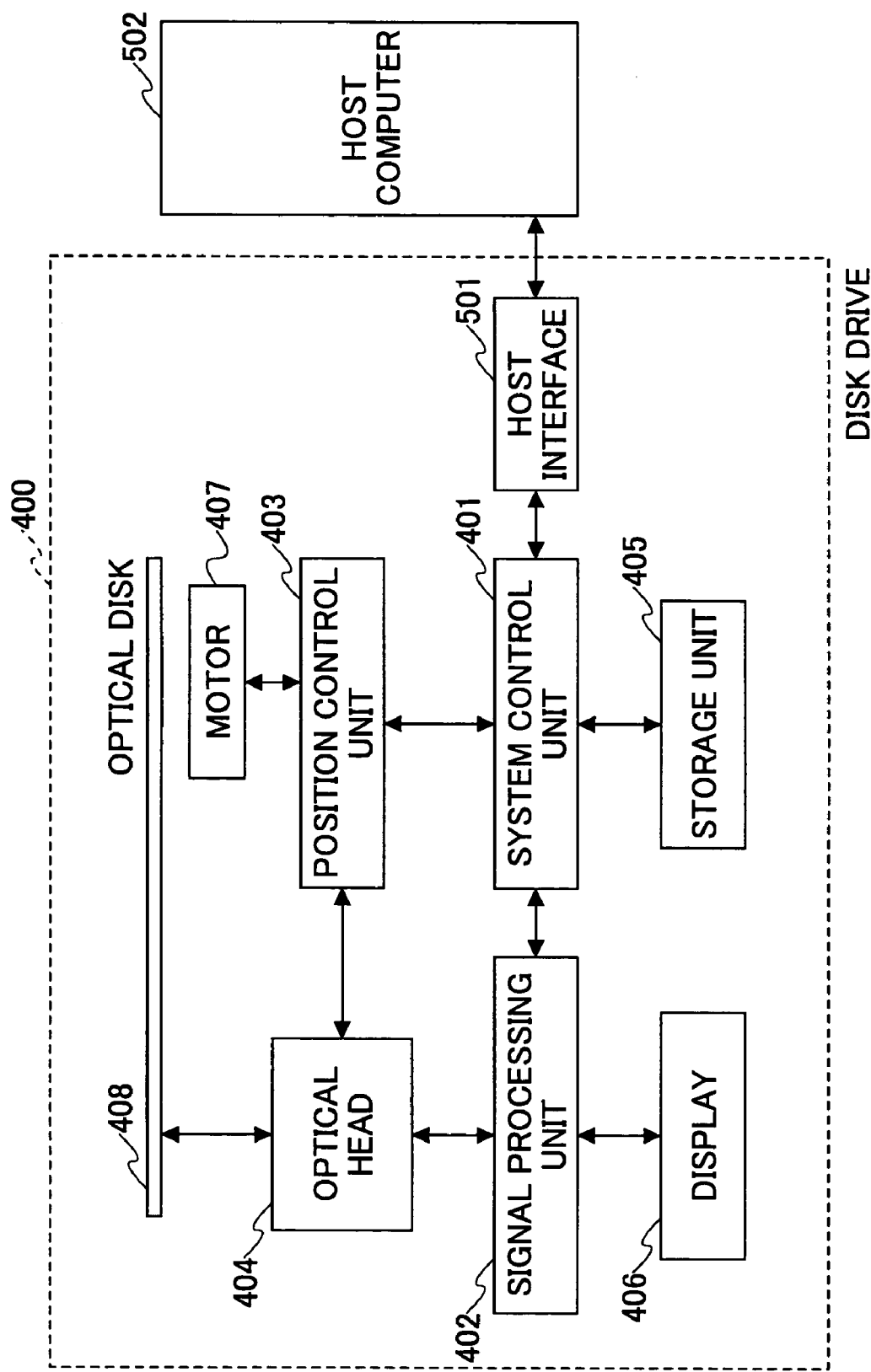
FIG. 5 is a block diagram of an optical disk drive of another preferred embodiment of the invention and a host computer which are connected together.

FIG. 5 shows an optical disk drive 400 of the present embodiment and a host computer 502 which are connected together via a host interface 501. In FIG. 5, the elements which are essentially the same as corresponding elements in FIG. 4 are designated by the same reference numerals, and a description thereof will be omitted.

The optical disk drive 400 of the present embodiment and the host computer 502 carry out the following operation. The optical disk drive 400 reads out a program which is pre-recorded in an optical disk, and the optical disk drive 400 transmits the program to the host computer 502 through the host interface 501, so that the program is stored in a storage device (not shown) of the host computer 502.

When starting the medium judgment method of the invention, a CPU of the host computer 502 reads out the above-mentioned program from the storage device (not shown), and transmits a command for requesting the medium judgment of the optical disk 408, to the optical disk drive 400 in accordance with the above-mentioned program.

As shown in FIG. 5, the optical disk drive 400 of the present embodiment is essentially the same as the optical disk drive of FIG. 4 except that the optical disk drive 400 further includes the host interface 501, and the host computer 502 is connected to the optical disk drive 400 via the interface 501.

The host interface 501 is provided in conformity with the standard specifications of the ATAPI (advanced technology attachment packet interface) or the SCSI (small computer system interface). The host computer 502 serves as the host equipment which controls the optical disk drive 400.

The program pre-recorded in the optical disk 408 is read by using the optical head 404, and the program is supplied from the optical head 404 to the system control unit 401 through the signal processing unit 402. Moreover, the optical disk drive 400 transmits the program to the host computer 502 through the interface 501, so that the program is stored in the storage device (not shown). The CPU of the host computer 502 reads the program from the storage device, and transmits the command to the optical disk drive 400 in accordance with the program, so that the medium judgment program of the invention to determine the authorization of the optical disk 408 is carried out.

According to the present invention, the authorization of a storage medium of interest is determined based on the second specific information which is pre-recorded in the information reproduction area of the medium when the first specific information from the wobbling groove of the medium is reproduced or copied. Even when the storage medium concerned is inserted in an optical disk drive which cannot read the first specific information of the medium, such as the CD-ROM drive, the judgment as to whether the storage medium concerned is an illegally copied medium or not can be performed with the same reliability as in the rewritable optical disk drive.

According to the present invention, the first specific information which is pre-recorded in the pregroove of the storage medium is acquired from the storage medium. The second specific information which is pre-recorded in the information reproduction area of the storage medium when the first specific information is reproduced or copied is acquired from the storage medium. The authorization of the storage medium of interest is determined based on the acquired first and second specific information. When the storage medium concerned is inserted in an optical disk drive which is capable of acquiring both the first specific information and the second specific information of the medium, the judgment as to whether the storage medium concerned is an illegally copied medium or not can be performed with a higher level of reliability.

The present invention is not limited to the above-described embodiments, and variations and modifications may be made without departing from the scope of the present invention.

Further, the present invention is based on Japanese priority application No. 2002-332526, filed on Nov. 15, 2002, and Japanese priority application No. 2003-139492, filed on May 16, 2003, the entire contents of which are hereby incorporated by reference.

What is claimed is:

1. A medium judgment method which determines authorization of a rewritable storage medium having a read-only area and a rewritable area for use in an optical disk drive, the method comprising steps of:
   acquiring a specific information of the medium from an information reproduction area of the read-only area of the medium;
   determining whether contents of the medium are authorized based on the acquired specific information;
   permitting running of a starting process of the optical disk drive with the medium when the authorization of the medium is determined as being correct; and
   inhibiting running of the starting process of the optical disk drive with the medium when the authorization of the medium is determined as being incorrect, and
   wherein the method is used to read the rewritable storage medium in a read-only optical disk drive which cannot acquire the specific information from the medium, such that acquisition of the specific information from the medium is impossible, such that a request to acquire the specific information from the medium during the acquiring step causes the read-only optical disk drive to generate error information, and wherein the medium is determined to be authorized based on the error information.

2. A medium judgment method which determines authorization of a rewritable storage medium having a read-only area and a rewritable area for use in a read-only optical disk drive, the method comprising steps of:
   acquiring a first specific information of the medium from a wobbling groove of the medium;
   acquiring a second specific information of the medium from an information reproduction area of the read-only area of the medium, the second specific information being pre-recorded in the information reproduction area when the first specific information is copied;
   determining whether contents of the medium are authorized based on both the acquired first specific information and the acquired second specific information;
   permitting running of a starting process of the optical disk drive with the medium when the authorization of the medium is determined as being correct; and
   inhibiting running of the starting process of the optical disk drive with the medium when the authorization of the medium is determined as being incorrect,
   wherein when the acquisition of the first specific information from the medium is impossible, such that a request for acquisition of the first specific information causes error information to be generated, and when the acquisition of the second specific information from the medium is possible, the medium is determined to be authorized based on both the error information and the acquired second specific information.

3. The medium judgment method of claim 2 wherein, when the acquisition of the first specific information from the medium is impossible and the acquisition of the second specific information from the medium is impossible, the authorization of the medium is determined based on both error information obtained in the first acquiring step and error information obtained in the second acquiring step.

4. A computer-readable storage medium storing a program causing a computer to execute a medium judgment method which determines authorization of a rewritable storage medium having a read-only area and a rewritable area for use in an optical disk drive, the method comprising steps of:
   acquiring a specific information of the medium from an information reproduction area of the read-only area of the medium;
   determining whether contents of the medium are authorized based on the acquired specific information;
   permitting running of a starting process of the optical disk drive with the medium when the authorization of the medium is determined as being correct; and
   inhibiting running of the starting process of the optical disk drive with the medium when the authorization of the medium is determined as being incorrect,
   wherein the rewritable storage medium is used in a read-only optical disk drive which cannot acquire the specific information from the medium, such that acquisition of the specific information from the medium is impossible, such that a request to acquire the specific information from the medium during the acquiring step causes the read-only optical disk drive to generate error information, and wherein the medium is determined to be authorized based on the error information.

5. A computer-readable storage medium storing a program causing a computer to execute a medium judgment method which determines authorization of a rewritable storage medium having a read-only area and a rewritable area for use in a read-only optical disk drive, the method comprising steps of:

acquiring a first specific information of the medium from a wobbling groove of the medium;

acquiring a second specific information of the medium from an information reproduction area of the read-only area of the medium, the second specific information being pre-recorded in the information reproduction area-when the first specific information is copied;

determining whether contents of the medium are authorized based on both the acquired first specific information and the acquired second specific information;

permitting running of a starting process of the optical disk drive with the medium when the authorization of the medium is determined as being correct; and inhibiting running of the starting process of the optical disk drive with the medium when the authorization of the medium is determined as being incorrect, wherein when the acquisition of the first specific information from the medium is impossible, such that a request for acquisition of the first specific information causes error information to be generated, and when the acquisition of the second specific information from the medium is possible, the medium is determined to be authorized based on both the error information and the acquired second specific information.

6. The computer-readable storage medium of claim 4 wherein, when the acquisition of the first specific information from the medium is impossible and the acquisition of the second specific information from the medium is impossible, the authorization of the medium is determined based on both error information obtained in the first acquiring step and error information obtained in the second acquiring step.

7. A medium judgment computer program stored on a computer-readable storage medium for causing a computer to execute a medium judgment method which determines authorization of a rewritable storage medium having a read-only area and a rewritable area for use in a read-only optical disk drive, the method comprising steps of:

acquiring a specific information of the medium from an information reproduction area of the read-only area of the medium;

determining whether contents of the medium are authorized based on the acquired specific information;

permitting running of a starting process of the optical disk drive with the medium when the authorization of the medium is determined as being correct; and inhibiting running of the starting process of the optical disk drive with the medium when the authorization of the medium is determined as being incorrect, wherein when the acquisition of the specific information from the medium is impossible, such that a request to acquire the specific information from the medium during the acquiring step causes the drive to generate error information, the medium is determined to be authorized based on the error information.

8. An optical disk drive which determines authorization of a rewritable optical disk having a read-only area and a rewritable area, comprising:

a system control unit controlling the entire optical disk drive;

an optical head irradiating a light beam to the disk and performing reading/writing of information with the disk by the control of the system control unit;

a motor rotating the disk;

a position control unit performing a position control of the optical head and a rotation control of the motor by the control of the system control unit; and a signal processing unit performing signal processing of data read from the disk by the control of the system control unit, the system control unit comprising:

an acquiring unit acquiring a specific information of the disk from an information reproduction area of the read-only area of the disk;

a determining unit determining whether contents of the disk are authorized based on the acquired specific information;

a permitting unit permitting running of a starting process of the optical disk drive with the disk when the authorization of the disk is determined as being correct; and an inhibiting unit inhibiting running of the starting process of the optical disk drive with the disk when the authorization of the disk is determined as being incorrect, wherein said optical disk drive is a read-only optical disk drive, such that the acquisition of the specific information from the disk is impossible, such that error information is generated, and wherein the medium is determined to be authorized based on the error information.

9. A read-only optical disk drive which determines authorization of a rewritable optical disk having a read-only area and a rewritable area, comprising:

a system control unit controlling the entire optical disk drive;

an optical head irradiating a light beam to the disk and performing reading/writing of information with the disk by the control of the system control unit;

a motor rotating the disk;

a position control unit performing a position control of the optical head and a rotation control of the motor by the control of the system control unit; and a signal processing unit performing signal processing of data read from the disk by the control of the system control unit, the system control unit comprising:

a first acquiring unit acquiring a first specific information of the disk from a wobbling groove of the disk;

a second acquiring unit acquiring a second specific information of the disk from an information reproduction area of the read-only area of the disk, the second specific information being pre-recorded in the information reproduction area when the first specific information is copied;

a determining unit determining whether contents of the disk are authorized based on both the acquired first specific information and the acquired second specific information;

a permitting unit permitting running of a starting process of the optical disk drive with the disk when the authorization of the disk is determined as being correct; and an inhibiting unit inhibiting running of the starting process of the optical disk drive with the disk when the authorization of the disk is determined as being incorrect, wherein when the acquisition of the first specific information from the disk is impossible, such that a request for acquisition of the first specific information causes error information to be generated, and when the acquisition of the second specific information from the disk is possible, the disk is determined to be authorized based on both the error information and the acquired second specific information.

10. The optical disk drive of claim 9 wherein, when the acquisition of the first specific information from the disk is impossible and the acquisition of the second specific information from the disk is impossible, the authorization of the disk is determined based on both error information obtained by the first acquiring unit and error information obtained by the second acquiring unit.

11. The method of claim 1, wherein the acquiring step includes issuing a READ TOC command.

12. The method of claim 11, wherein the acquired specific information includes a value of Last Possible Start Time of Lead-out.

13. A medium judgment method which determines authorization of a rewritable storage medium having a read-only area and a rewritable area for use in an optical disk drive, the method comprising steps of:
    acquiring a specific information of the medium from an information reproduction area of the read-only area of the medium;
    determining whether contents of the medium are authorized based on the acquired specific information;
    permitting running of a starting process of the optical disk drive with the medium when the authorization of the medium is determined as being correct; and
    inhibiting running of the starting process of the optical disk drive with the medium when the authorization of the medium is determined as being incorrect,
    wherein the method is used to read the rewritable storage medium in a read-only optical disk drive, and when the acquisition of the specific information from the medium is impossible, the medium is determined to be authorized based on an error code indicating that a READ TOC command is an illegal request.

14. A medium judgment method which determines authorization of a rewritable storage medium having a read-only area and a rewritable area for use in a read-only optical disk drive, the method comprising steps of:
    acquiring a first specific information of the medium from a wobbling groove of the medium;
    acquiring a second specific information of the medium from an information reproduction area of the read-only area of the medium, the second specific information being pre-recorded in the information reproduction area when the first specific information is copied;
    determining whether contents of the medium are authorized based on both the acquired first specific information and the acquired second specific information;
    permitting running of a starting process of the optical disk drive with the medium when the authorization of the medium is determined as being correct; and
    inhibiting running of the starting process of the optical disk drive with the medium when the authorization of the medium is determined as being incorrect,
    wherein when the acquisition of the first specific information from the medium is impossible and the acquisition of the second specific information from the medium is possible, the authorization of the medium is determined based on both a kind of error information obtained in the first acquiring step and the acquired second specific information; and
    wherein the step of acquiring the first specific information includes issuing a READ ATIP command.

15. The method of claim 14, wherein the first specific information includes a value of Last Possible Start Time of Lead-out.

16. The method of claim 15, wherein the error information includes an error code indicating that the READ ATIP command is an illegal request.

* * * * *